(12) United States Patent
Hagerman et al.

(10) Patent No.: US 8,706,121 B2
(45) Date of Patent: *Apr. 22, 2014

(54) DATA PROCESSING IN INTRA-SITE HANDOVER

(71) Applicant: Unwired Planet, LLC, Reno, NV (US)

(72) Inventors: Bo Hagerman, Stockholm (SE);
Fredrik Ovesjö, Stockholm (SE); Björn Gunnar Johannisson, Kungsbacka (SE); Kimmo Hiltunen, Stockholm (SE)

(73) Assignee: Unwired Planet, LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,442

(22) Filed: Feb. 11, 2013

(65) Prior Publication Data

US 2013/0150049 A1   Jun. 13, 2013

Related U.S. Application Data

(63) Continuation of application No. 11/628,939, filed as application No. PCT/SE2004/001067 on Jun. 30, 2004, now Pat. No. 8,374,607.

(51) Int. Cl.
*H04W 4/00* (2009.01)

(52) U.S. Cl.
USPC .......................................... 455/436; 370/332

(58) Field of Classification Search
USPC .................. 455/436, 522, 437; 370/332, 335
See application file for complete search history.

(56) References Cited

U.S. PATENT DOCUMENTS

| | | |
|---|---|---|
| 5,161,249 A | 11/1992 | Meche et al. |
| 5,640,676 A | 6/1997 | Garncarz et al. |
| 5,933,787 A | 8/1999 | Gilhousen et al. |
| 5,966,670 A | 10/1999 | Keskitalo et al. |
| 6,151,512 A | 11/2000 | Cheda et al. |
| 6,311,068 B1 | 10/2001 | Leung et al. |
| 6,347,234 B1 | 2/2002 | Scherzer |
| 6,388,615 B1 | 5/2002 | Chang et al. |
| 6,463,301 B1 | 10/2002 | Bevan et al. |
| 6,473,624 B1 | 10/2002 | Corbett et al. |
| 6,631,266 B1 | 10/2003 | Lee et al. |

(Continued)

FOREIGN PATENT DOCUMENTS

| | | |
|---|---|---|
| EP | 1056304 A3 | 12/2000 |
| EP | 1237310 A2 | 9/2002 |
| WO | 2004/004148 A1 | 1/2004 |
| WO | 2004/106436 A1 | 6/2004 |

OTHER PUBLICATIONS

U.S. Appl. No. 11/628,939, filed Sep. 19, 2008: Inventor: Hagerman et al.

(Continued)

*Primary Examiner* — Phuoc H Doan
(74) *Attorney, Agent, or Firm* — Nixon & Vanderhye P.C.

(57) ABSTRACT

The technology involves data processing during intra-site handover procedures. At least two directional antennas of a base station receive data carrying signals originating from a mobile units positioned in an intra-site handover area defined by the overlapping radio coverage of the antennas. The directional antennas performs an initial data signal detection of the received data signals resulting in detected data, which typically results in a loss of radio performance of the antenna. The detected data from the directional antennas is then processed to generate processed data. The performance loss is compensated by providing differential antenna gain of the directional antennas within the handover area.

18 Claims, 9 Drawing Sheets

(56) References Cited

U.S. PATENT DOCUMENTS

| | | |
|---|---|---|
| 6,836,674 B2 | 12/2004 | Taniguchi et al. |
| 7,146,164 B2 | 12/2006 | Hunzinger |
| 7,171,164 B2 | 1/2007 | Ylitalo |
| 7,236,808 B2 | 6/2007 | Goldberg |
| 7,346,351 B2 | 3/2008 | Shin |
| 7,386,305 B2 | 6/2008 | Etkin et al. |
| 7,826,471 B2 | 11/2010 | Wilson et al. |
| 2003/0060205 A1 | 3/2003 | Shapira |
| 2003/0114196 A1 | 6/2003 | Chitrapu |
| 2004/0106436 A1 | 6/2004 | Ochi et al. |
| 2004/0152415 A1 | 8/2004 | Anagnos |
| 2004/0204110 A1 | 10/2004 | Davidson |
| 2008/0218414 A1 | 9/2008 | Hagerman et al. |
| 2009/0023447 A1 | 1/2009 | Hagerman et al. |

OTHER PUBLICATIONS

U.S. Appl. No. 11/629,205, filed Dec. 12, 2006; Inventor: Hagerman et al.
U.S. Appl. No. 11/629,205, filed Dec. 2006; Inventor: Hagerman.
Office Action mailed Feb. 16, 2011 in U.S. Appl. No. 11/629,205.
Office Action mailed Jul. 20, 2011 in U.S. Appl. No. 11/629,205.
International Search Report for PCT/SE2004/001070 mailed Feb. 11, 2005.
International Search Report mailed Feb. 11, 2005 in PCT application PCT/SE2004/001067.
English translation of Chinese Office Action mailed Jul. 3, 2009 in corresponding Chinese application 200480043478.7.
3GPP TR 25.922 V5.2.0 (2003) $3^{rd}$ Generation Partnership Project; Technical Specification Group Radio Access Network; Radio Resource Management Strategies (Release 5).

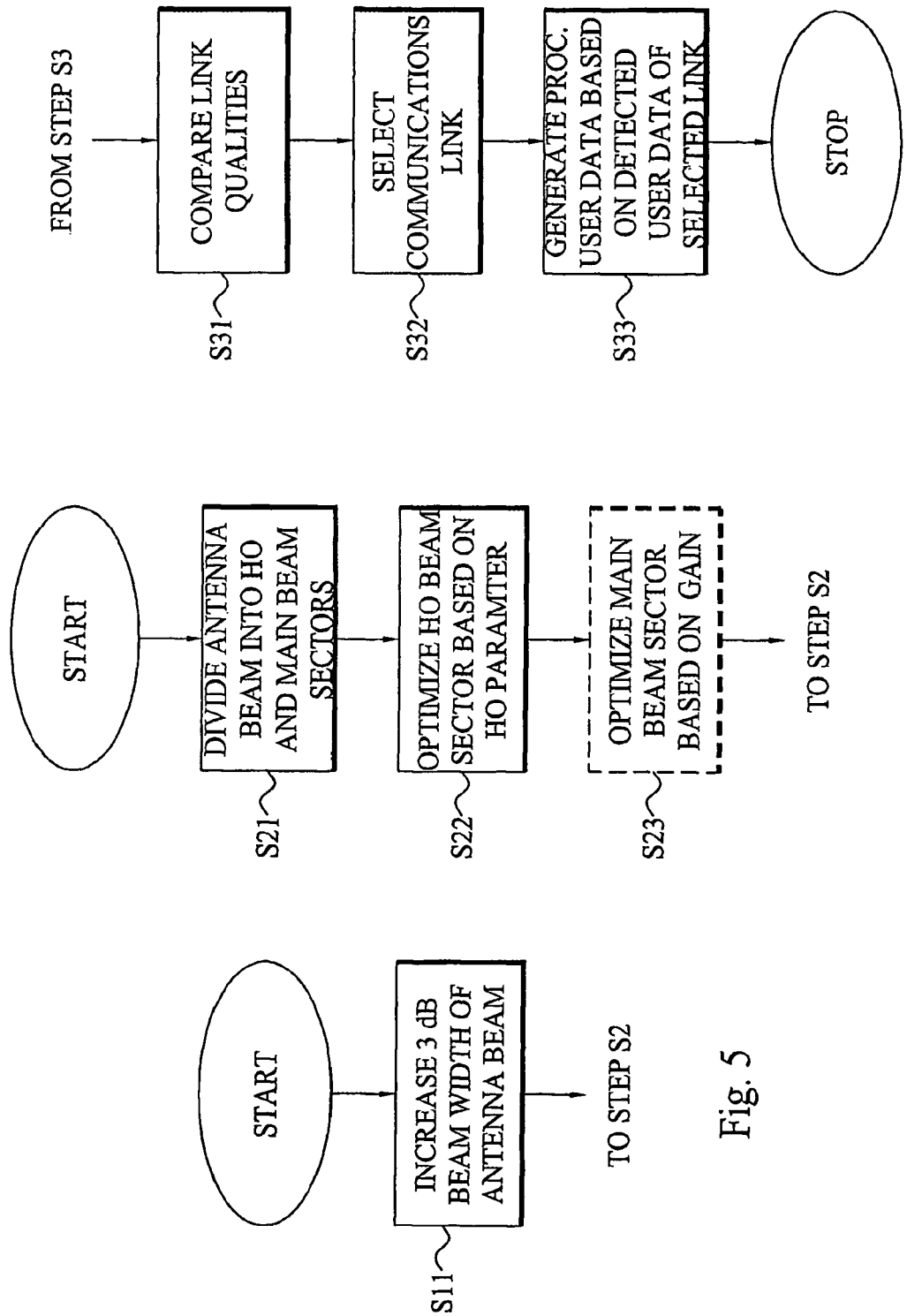

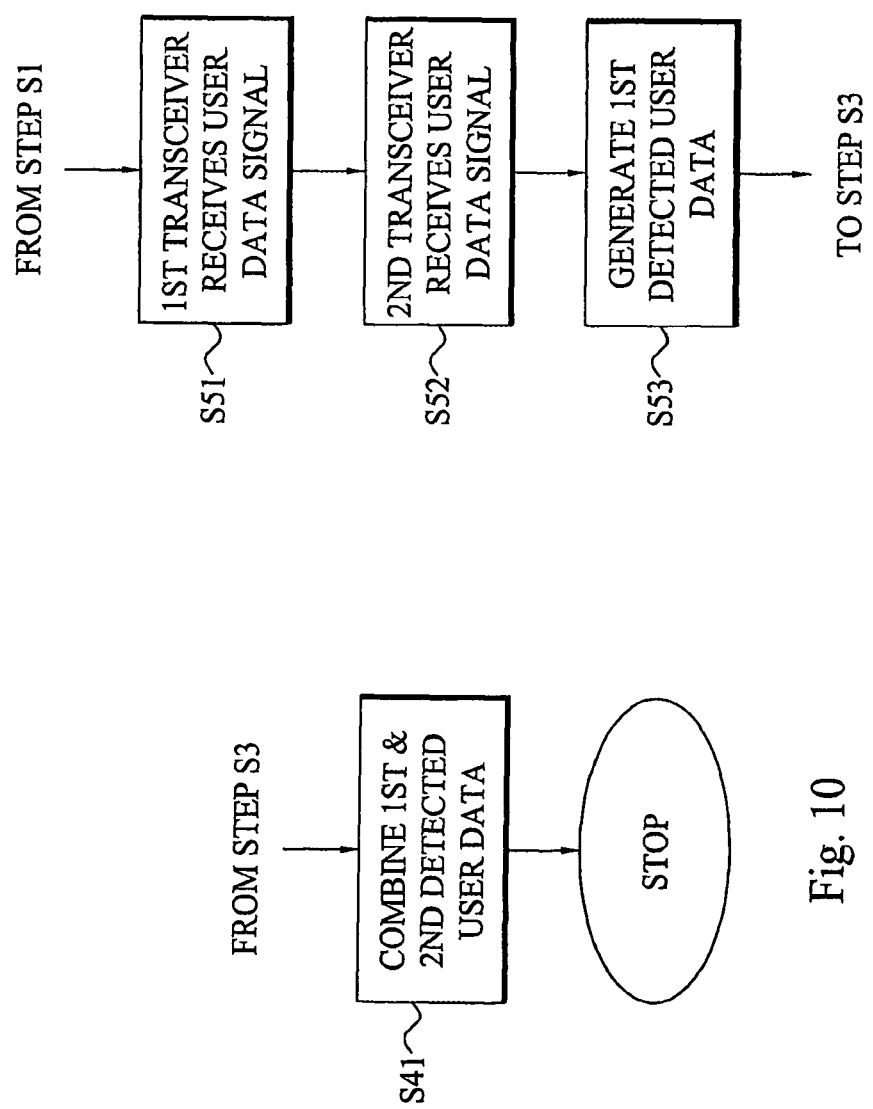

DATA PROCESSING IN INTRA-SITE HANDOVER

PRIORITY APPLICATIONS

This application is a continuation application claiming priority from U.S. application Ser. No. 11/628,939, filed Sep. 19, 2008, which is the U.S. national phase of International Application No. PCT/SE2004/001067 filed 30 Jun. 2004 which designated the U.S., the entire contents of each of which are hereby incorporated by reference.

TECHNICAL FIELD

The technology generally relates to data processing in communications systems, and in particular to data processing during intra-site handover procedures in such systems

BACKGROUND

A typical cellular radio communications system comprises a number of (radio) base stations (RBSs) providing communications resources to mobile units and user equipment present in the system. A base station often has multiple (e.g. at least two) associated directional antenna units that are able to provide the communications services through several separated sectors or cells within the total coverage area of the base station.

In order to enable seamless movement of a mobile unit between different cells during a communications session, the radio coverage areas of neighboring cells typically, at least partly, overlap. Such an overlapping coverage area is denoted handover area or region in the art.

The size of the handover area depends on measurement control parameters. A minimum region requirement is that a mobile unit travelling from one base station and/or cell to another has time to measure, report, configure and synchronize to the new base station and/or cell before the communications link to the old cell has to be dropped due to insufficient signal quality.

There is a clear distinction in operation between moving from cells on different base stations (or sites) and cells on the same site, the former being denoted soft handover and the latter is a so-called softer handover.

For softer (intra-site) handover, the single base station simultaneously transmit, using its different directional antennas, the same information over each of the cells to the mobile unit, thus, creating transmit macro diversity gain. Correspondingly, signals communicated from the mobile unit are received through the different cell radio hardware (antenna equipment) in the single base station. The received unprocessed signals from these cells are then usually directly combined using a maximal-ratio combining (MRC) or equivalent configured receiver or detector. MRC is generally superior compared to the information combining techniques used for soft handover, where the mobile-unit-originating data are received and detected by different base stations.

However, softer handover and MRC signal reception implies restrictions and complexity to the antenna-related equipment in the base stations. For example, in softer handover all internal cells radio chains of a given base station have to be fully accessible for all receivers in the base station. This complexity, thus, will be affected by the number of diversity paths or radio chains available, which can be quite high, especially for multi-antenna based RBS configuration or arrangement. In addition, the increased number of communication paths for the signal, due to the softer handover with corresponding control signaling in the radio access network, results in more signals transmitted by the base station that, by constructive combining of the transmitted energy, in turn leads to an increased coverage and/or transmission area. This increased coverage and/or transmission area will effect the interference situation in the system by increasing the interference levels. The increased number of communications paths also takes capacity resources from the system. In summary, seamless mobile communications utilizing softer handover and MRC generally yield the best statistical reduction of fading, however, this comes as a cost of more complex antenna equipment, increased interference and reduced capacity.

SUMMARY

The technology described in this application overcomes these and other drawbacks It is a general object to provide an enhanced intra-site handover procedures in communications systems.

It is another object to provide a data processing applicable during intra-site handover procedures in communications systems.

Yet another object is to provide a simple antenna-related base station architecture applicable for intra-site handover procedures in communications systems.

Briefly, the technology described in this application involves intra-site handover procedures and data processing during such handover procedures in radio communications systems. A mobile unit positioned within an intra-site handover area and connected to at least two directional antenna units of a base stations generates and transmits signals carrying user data. These user data signals are received by the directional antenna units and are initially detected and processed resulting in first and second detected (demodulated) user data. Due to limitations and non-optimal performance of the antenna-related units, this data signal detection contributes to a performance loss, which generally results in that the directional antenna units would not be able to provide as a large radio coverage in the handover area and still being able to successfully process and interpret the user data signals.

In order to balance or compensate for the detection performance loss of the initial data signal detection and processing, the antenna beam of at least one of the directional antenna units involved in the intra-site handover procedure is adjusted in order to increase the antenna gain within the intra-site handover area. Thus, instead of providing a complex antenna and base station arrangement to enable increased performance and radio coverage in the handover area, the inventors solve this by increasing the antenna gain in this handover area. This means that higher antenna gain levels are obtained in this portion of the antenna beam or cell, at least during the intra-site handover procedure, compared to the prior art antenna arrangements.

In addition, the detected user data from the directional antenna units are then jointly processed to give the demodulated and processed user data. This jointly data processing can be realized as a data set selection and/or combining. The final processed user data can then be forwarded to other network units in the communications system and/or transmitted to other mobile units.

This jointly processing may advantageously also use soft information, e.g. quality indicators or estimations, associated with the respective detected user data in order to enhance the performance of the directional antenna units further.

The differential adjustment of antenna gain can be realized by a redistribution of the directivity of the directional antenna unit(s) into this handover area, which is discussed in more detail below. Generally, the purpose of this antenna gain adjustment is to balance the radio performance loss during the data signal detection and processing so that the resulting total performance in connection of the user data processing still is adequate and enables adequate radio coverage in the handover area.

This differential increase in antenna gain and coverage can be implemented by redistributing the directivity in the horizontal dimensional from other parts of the antenna diagram. For example, the (3 dB) beam width of the antenna beam can be increased, possibly at the sacrifice of maximum obtainable gain in the remaining portion of the antenna beam. However, the resulting minor reduction of peak antenna gain coming from the redistribution of directivity in the horizontal dimension can be compensated by a slight increase of the antenna height and/or reduced losses in the communications system Alternatively, or in addition, the adjustment of antenna gain in the handover area can be obtained by (virtually) dividing the antenna beam of the directional antenna into different beam sectors and then applying a differential adjustment of the shape of this individual beam sectors based on different objectives. The division preferably results in at least a handover beam sector and a main beam sector. The shape of the handover beam sector is then adjusted to provide at least a minimum antenna gain (radio coverage) and preferably a minimum angular interval within this beam sector.

The increase in antenna gain can be obtained by mechanically adjusting the mechanical structures, e.g. baffles, ground plane and/or secondary radiators, of the directional antenna unit(s). Furthermore, if the directional antenna unit is a group antenna with multiple antennas, the desired beam shape can be obtained by adjusting the relative amplitude and/or phase excitations of the antennas.

The jointly processing step can be implemented as a selection process, where signal or link qualities for the communications channels between the mobile unit and the directional antenna units are estimated and compared. Thereafter, the processed user data is generated based on the detected user data associated with the communication channel having the current best link quality. Alternatively, the detected user data from the directional antenna units in the base station can be combined in order to increase or improve the correctness of the information content. In either case, the jointly processing can be performed in the relevant base station or in an external network unit, e.g. a radio network controller or base station controller.

The technology described in this application offers the following advantages:

Provides a less complex and costly antenna-related and base station design compared to prior art designs involved in intra-site handover;

Decreases interference levels due to a reduction in the number of necessary communications paths for user data signals;

Releases communications resources and increases capacity due to a reduction in the number of necessary communications paths for user data signals; and Provides radio coverage that remain similar to or improve compared with the complex and costly prior art antenna-related solutions.

Other advantages will be appreciated upon reading of the below description.

SHORT DESCRIPTION OF THE DRAWINGS

FIG. 5 is a flow diagram illustrating an embodiment of the antenna gain increasing step of the method of FIG. 3;

FIG. 6 is a flow diagram illustrating another embodiment of the antenna gain increasing step of the method of FIG. 3;

FIG. 9 is a flow diagram illustrating an embodiment of the jointly processing step of FIG. 3;

FIG. 10 is a flow diagram illustrating another embodiment of the jointly processing step of FIG. 3;

FIG. 11 is a flow diagram illustrating an embodiment of the data reception step of FIG. 3;

FIG. 12 is a schematic block diagram illustrating a;

DETAILED DESCRIPTION

Figure 1:
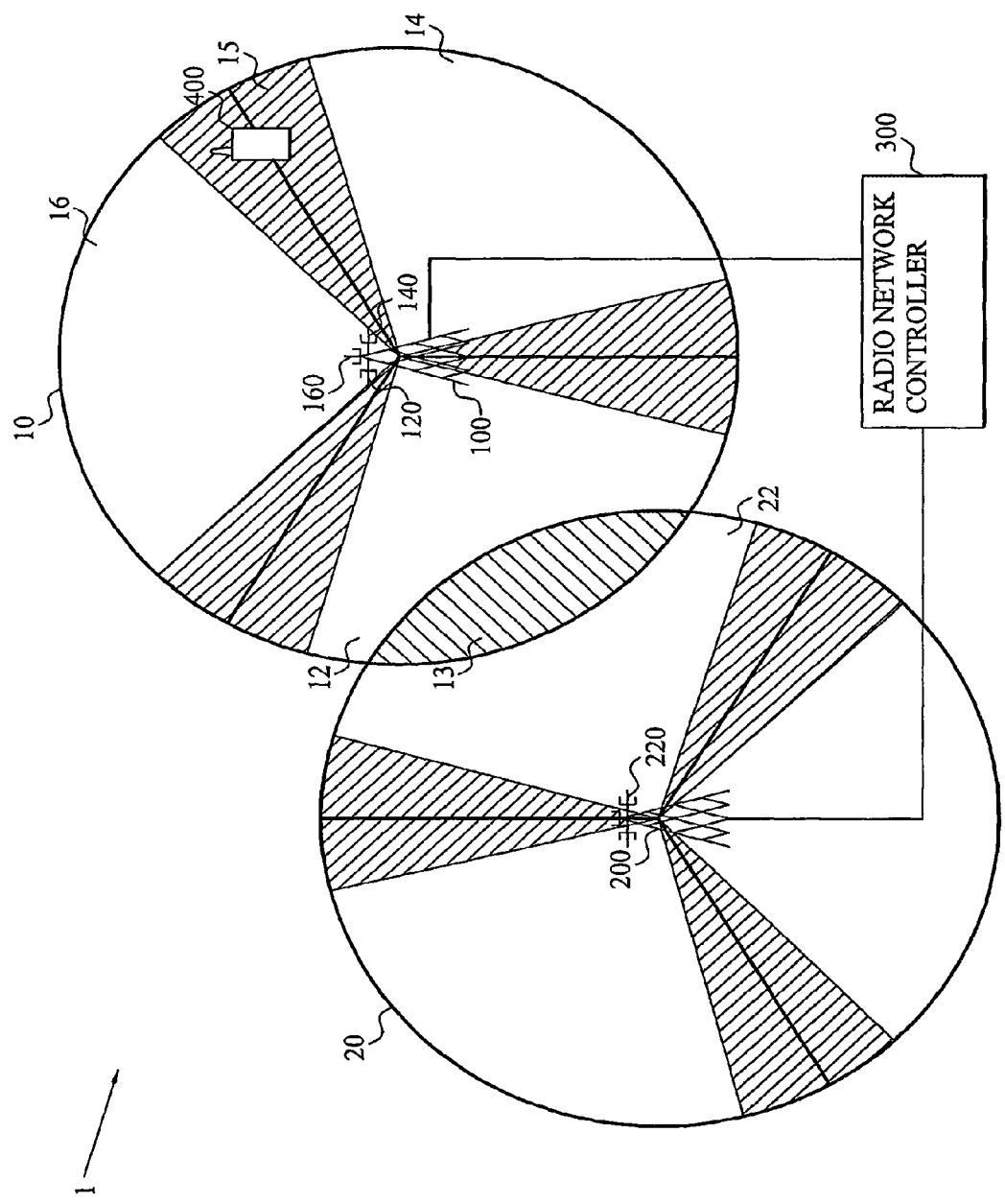
FIG. 1 is a schematic overview of a portion of a communications system.

Throughout the drawings, the same reference characters will be used for corresponding or similar elements.

The technology described in this application relates to data processing in connection with intra-site handover procedures in radio communications systems and provides a novel intra-site handover operation that results in reduced antenna complexity and reduced interference levels in the communications systems but with radio coverage and capacity that will remain or improve in comparison to prior art systems.

FIG. 1 is a schematic overview of a portion of a radio communications system 1, to which the teachings of this application can be applied. In FIG. 1 only arrangements and units directly involved are shown in order to simplify the illustration. The technology described in this application can typically be applied to different types of communications systems 1 including a GSM (Global System for Mobile communications) system, different CDMA systems, e.g. a WCDMA (Wideband CDMA) system, a Time Division Multiple Access (TDMA) system, a Frequency Division Multiple Access (FMDA) system or any other radio communications systems utilizing whatsoever multiple access method, e.g. an Orthogonal Frequency Division Multiple Access (OFDMA) system.

The radio communications system 1 comprises a number of radio base stations (RBSs) or base station transceivers 100, 200, of which only two are illustrated in the figure. The RBSs 100, 200 enable utilization of communications services within their provided radio coverage areas 10, 20.

In the figure, the RBS 100 has been illustrated with multiple associated directional antenna units 120, 140, 160 that provides radio coverage in different sectors or cells 12, 14, 16 of the total radio coverage area 10 of the site where the base station 100 is located. The RBS 100 can include three directional antenna units 120, 140, 160 with different main directions as is illustrated in the figure. However, the technology described in this application can also be applied for another base station configuration that includes multiple, i.e. at least two, directional antennas, e.g. 2, 3, 6 or 12 directional antennas.

The directional antennas 120, 140, 160 could be configured for together providing total radio coverage 10 within a general area surrounding the RBS 100, e.g. circular, hexagonal or star-shaped. However, it is also possible that the total coverage area 10 of the directional antennas 120, 140, 160 arranged in a RBS 100 only constitutes a portion or sector of a general area. For example, if the directional antenna 120 is omitted, no radio coverage will be provided by the RBS 100 within the area denoted 12. This may be the case when the network operator is not interested in providing radio coverage and, thus, communications services within certain areas that may e.g. include large mountains or other objects, rendering the area inaccessible for the users of mobile units 400. In either way, neighboring cells 14, 16 associated with the RBS 100 or site preferably partly overlaps 15 in order to enable a seamless movement of a mobile unit 400 with an ongoing communications session. Similarly, cells 12, 22 of neighboring sites or base stations 100, 200 also partly overlaps 13.

In order to enhance understanding, a short discussion of intra-site or softer and inter-site or soft handover procedures as exemplified by a WCDMA radio communications system 1 follows. As is known in the art, the mobile unit 400 intermittently or periodically performs signal quality measurements of communications channel(s) in the so-called active set. This active set includes those cells 14, 16 to which the mobile unit 400 currently is connected. The mobile unit 400 preferably also measures signal quality of communications channels in the so-called candidate set.

This candidate set includes neighboring cells 12 to the cell(s) 14, 16 in the active set. These signal quality measurements are then reported to a central unit connected to and managing the base stations 100, represented by a radio network controller (RNC) 300 in the figure. The RNC 300 then verifies, based on the received measurement data, whether a handover procedure should be triggered and executed for the mobile unit 400.

Starting with soft handover, the mobile 400 is then present in a inter-site handover area 13, in which the radio coverage of at least two cells 12, 22 of different sites or RBSs 100, 200 overlaps. The directional antennas of these cells 120, 220 have been commanded by the RNC 300 to detected the same user data signal originating from the mobile unit 400. In addition, signal or link quality measurements are performed on the communications link between the mobile unit 400 and the two antennas 120, 220. The detected and processed user data is then forwarded together with the link quality data from the two base stations 100, 200 to the RNC 300. The RNC 300 will then typically perform a selection diversity combining (SDC) on the two received data streams by selecting, per data frame or block basis, the processed user data from the communications link that currently has the best link quality as determined based on the quality measures. Thus, generally the user data signal content as received by only a single directional antenna is mainly used for further processing in the communications system 1.

However, during intra-site handover the mobile unit 400 is positioned in an intra-site handover area 15, where the radio coverage of two neighboring cells 14, 16 of a same site partly overlaps. In this form of handover, the radio chains from all receivers (directional antennas 120, 140, 160) of the relevant base station 100 have to be interconnected. In the illustrated example of FIG. 1, this will result in 6 radio chains, in case each directional antenna 120, 140, 160 is equipped with two receivers (creating uplink diversity reception). The received unprocessed user data carrying signals from all available receivers and radio chains are directly combined, typically according to maximum ratio combining (MRC) or an equivalent combining technique, in the base station 100. Thus, by using unprocessed data signals from multiple receivers in the data combination a superior data processing and improved detection performance is obtained compared to the selection combining of soft handover. However, this comes as a cost in increased antenna-related equipment and base station architecture. In addition, the interference levels in the system will increase as was discussed in the background section. Furthermore, the increased number of communications paths takes communications resources, e.g. codes, frequencies and/or time slots, from the system 1, thereby affecting the capacity in the system 1.

Figure 2:
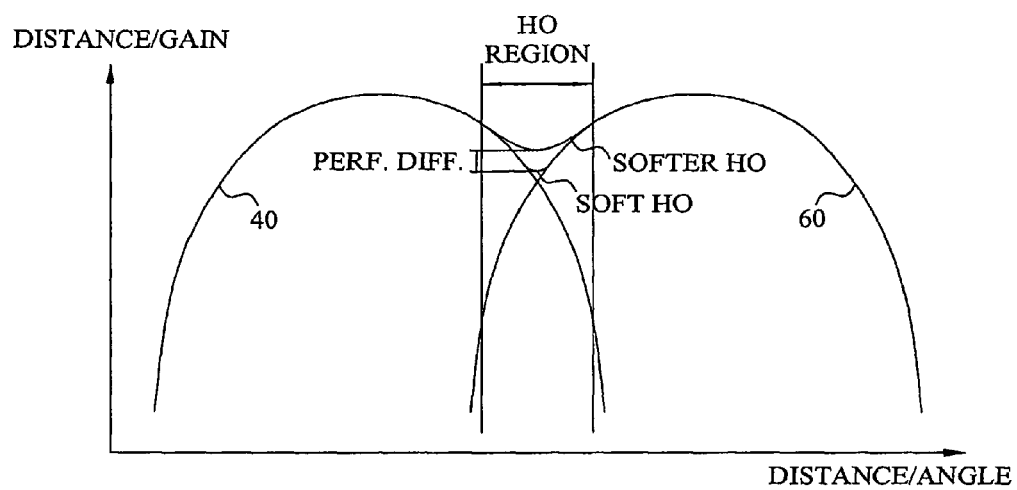
FIG. 2 is a schematic diagram illustrating two neighboring antenna beams comparing the gain in the handover region between soft and softer handover.

FIG. 2 is an antenna diagram illustrating the maximum radio coverage (antenna beam) 40, 60 of two neighboring cells according prior art solutions. Firstly, assume that the two cells are of different sites, i.e. they are arranged in physically separated base stations. By employing the prior art data processing during soft handover, the performance and, thus, the resulting maximum radio coverage in the handover area is according to the line denoted soft HO in the figure. However, by applying the more complex MRC-based data processing during softer handover, a higher performance and radio coverage (softer HO in the figure), within this handover area is typically obtained. Thus, softer handover generally results in higher performance compared to soft handover within the handover area when employing prior art techniques.

The technology described in this application provides similar performance and radio coverage as the prior art data processing in softer handover but with less complex and expensive hardware equipment, reduced interference levels and increased system capacity.

Figure 3:
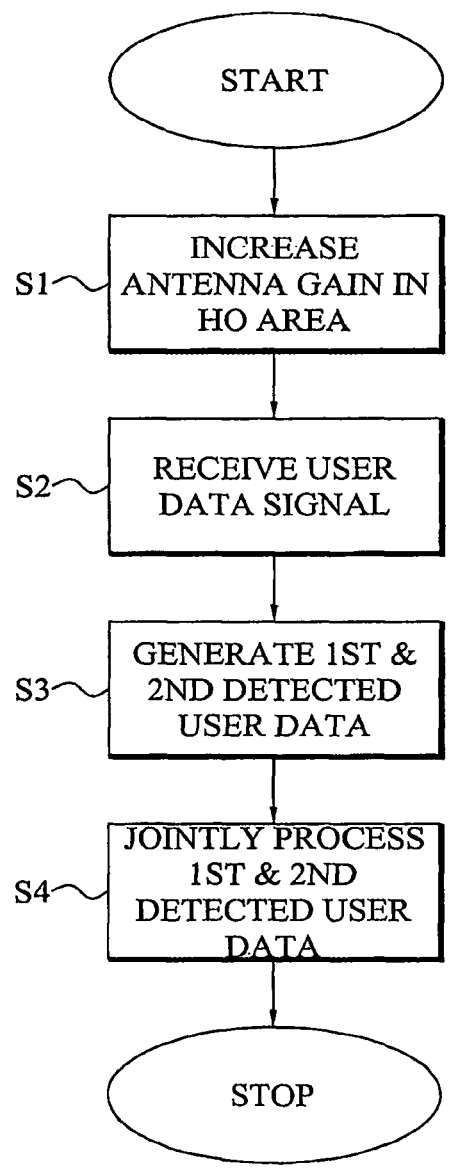
FIG. 3 is a flow diagram illustrating the data processing method.

FIG. 3 is flow diagram of a method of processing user data according to an example embodiment. In this method, user data carrying signals originating from a mobile unit positioned in an intra-site handover area, where the radio coverage of two neighboring directional antenna units of same base station or site overlaps, are processed during the handover procedure. Instead of providing a complex antenna-related and base station arrangement to enable increased performance and radio coverage in the handover area, the antenna gain of a directional antenna in the handover area is increased in step S1. This means that higher antenna gain levels are obtained in this portion of the antenna beam or cell, at least during the intra-site handover procedure, compared to the prior art antenna arrangements. As was discussed above, during an intra-site handover, the mobile unit is simultaneously connected to at least two neighboring directional antenna units arranged in the same RBS. In this antenna gain increasing step S1, the antenna gain in the handover area of one of these at least two directional antenna units can be adjusted and increased. Alternatively, the antenna gain of both the neighboring antenna units is increased. This differential adjustment of antenna gain can be realized by a redistribution of the directivity or available antenna energy/gain of the directional antenna unit(s) into this handover area, which is discussed in more detail below. Generally, the purpose of this antenna gain adjustment is to compensate or balance for the performance loss, including radio coverage loss, during the data signal processing using the somewhat more simple signal demodulation and detection.

In a next step S2, the two neighboring directional antenna units receive (undistorted) user data RF signals originating from the mobile unit positioned in the handover area. The user data signals received by the different antenna units include the same information content. However, due to detrimental effects of e.g. channel fading and co-channel interference the quality of the data signals received by the at least two antenna units may differ. The RNC or RBS has, thus, ordered the two directional antenna units to connect (listen) to this mobile station so that the communicated signals from the mobile station is received through both the cells radio hardware equipment (directional antenna units) in the single RBS. An initial signal processing or detection is then performed in the respective directional antenna unit or in connection thereof in step S3. This user data signal detection includes those initial steps that are generally performed in a receiver, including e.g. demodulation, A/D-conversion, user data regeneration and decoding. However, due to limitations and finite operation of the detection equipment this signal detection will be somewhat reduce the maximum performance of the directional antenna, e.g. as manifested in provided radio coverage area. Thus, due to this performance (information) loss, the directional antenna units would not be able to provide as a large radio coverage in the handover area and still being able to successfully process and interpret the user data signals as the complex prior art MRC solutions if not the antenna gain in this handover area had been increased in step S1. The increased antenna gain could then be viewed as a compensation for the usage of a less complex and expensive user data processing technique and for the lack of performance gain that would result from MRC and equivalent combining of unprocessed RF signals. In the final step S4, the first and second detected and demodulated (reduced-information) data from the two neighboring directional antenna units is then jointly processed. As a result of this jointly processing, processed user data that can be employed by the communications system, e.g. transmitted to a second mobile unit or another network unit, is obtained. This jointly processing can be realized as a selection between the detected user data with the best data content, e.g. as determined based on signal quality comparisons. Alternatively, a user data combining can be employed in this jointly processing of step S4. The method then ends.

In a first example embodiment, the detected (demodulated) user data includes a control data portion and a payload data portion. The jointly processing of step S4 can then be performed either on the control data portion, payload data portion or the control and payload data portion of the detected user data.

Furthermore, the jointly processing can be performed in the RBS, in which the directional antenna units are arranged, for example after the initial signal detection (demodulation) or after decoding. The resulting processed user data will then be transmitted from this RBS to external units, e.g. a RNC. Alternatively, the generated (first and second) detected user data is transmitted from the RBS to an external jointly data processor, e.g. as provided in the RNC or BSC (base station controller) connected to the RBS.

Figure 4:
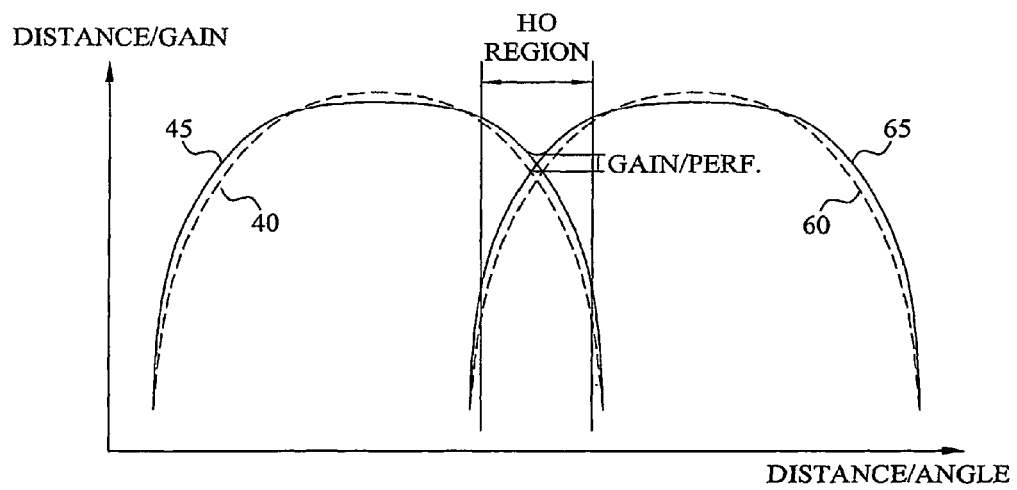
FIG. 4 is a schematic diagram illustrating an example of two neighboring antenna beams optimized.

FIG. 4 is an antenna diagram comparing the radio coverage of two neighboring directional antenna beams of a prior art solution without MRC combining (dashed lines) 40, 60 with the corresponding coverage 45, 65. As is evident from the figure, the antenna beams 45, 65 of the two directional antenna units partly overlaps in the handover area or region. The antenna gain of at least one of these neighboring directional antenna units is then increased in this handover area. As a result, an increased performance and coverage in this portion of the total radio coverage area is obtained This differential increase in antenna gain and coverage can be implemented by redistributing the directivity in the horizontal dimensional from other parts of the antenna diagram. For example, the (3 dB) beam width of the antenna beams 40, 60 can be increased, possibly at the sacrifice of maximum obtainable gain in the remaining portion of the antenna beam 40, 60. However, the resulting minor reduction of peak antenna gain coming from the redistribution of directivity in the horizontal dimension can be compensated by a slight increase of the antenna height and/or reduced losses in the communications system.

The increase in antenna gain can, e.g. due to redistribution of antenna directivity, be obtained by mechanically adjusting, e.g. moving and/or rotating, a mechanical structure of the directional antenna unit(s). Such a mechanical structure can be the baffles around the antenna radiators, the ground plane behind the antenna radiators and/or a structure that couples energy from the radiators, e.g. secondary radiators. Furthermore, if, the directional antenna unit is a group antenna with multiple antennas, the desired beam shape can be obtained by adjusting the relative amplitude and/or phase states or excitations of the antennas. As the person skilled in the art understands, any procedure that results in an increase in antenna gain and coverage within this handover area could be used.

As a result, similar radio performance as for the complex MRC-based user data processing in intra-site handover can be obtained but with much less complex and costly equipment.

FIG. 5 is a flow diagram of an embodiment of the antenna gain increasing step of FIG. 3. In the step S1, the (3 dB) beam width of the antenna beam of a directional antenna unit is increased, e.g. by redistributing the directivity of the antenna unit into the handover area. The method then continues to step S2 of FIG. 3.

FIG. 6 is a flow diagram of another example embodiment of the antenna gain increasing step of FIG. 3. In this embodiment different beam sector portions of the antenna beam of a directional antenna unit are defined. The shape of these beam sectors is then optimized based on different objects and requirement. In a preferred embodiment, at least a first or handover related beam sector of the total antenna beam of a directional antenna unit is defined. This beam sector definition preferably is performed by (virtually) dividing the antenna beam of the directional antenna unit into at least the handover beam sector and a second or main beam sector in step S21. In step S22, the shape of the handover beam sector is adjusted by providing a minimum antenna gain of the directional antenna in this handover beam sector. Thus, the antenna gain in the beam sector should exceed a minimum threshold, the value of which is determined based on the handover parameter settings in the system. In addition, or alternatively, the angular interval of this handover beam sector is preferably provided larger than an angular threshold. The value of this angular threshold is determined based on the handover parameter settings in the system. Thus, the angular size of this handover beam sector will be adapted to (intra-site) handover requirements and the threshold value is chosen to allow triggering and completion of a handover procedure for a mobile unit crossing the handover beam sector. In the optional step S23 the shape of the main beam sector is optimized or adjustment. This optimization is performed by maximizing the antenna gain of the directional antenna in this main beam sector. The method then continues to step S2 of FIG. 3.

The handover beam sector is preferably defined as that portion of the antenna beam where the difference in received signal level associated with the directional antenna unit and with its neighboring antenna unit in the handover beam sector is smaller than a first threshold T1. The relevant signal level is in a first embodiment, the signal strength level as measured by the directional antenna(s). This signal level is measured and determined based on data transmitted by a mobile unit and received by the antenna. In a second embodiment, the received signal level is determined by the mobile unit and reported to the directional antenna(s). Thus, in this embodiment, it is the directional antenna(s) that transmit(s) data that is received and measured by the mobile unit.

In either case, as is known in the art, the received signal level generally declines for larger radio distances from the signal source, e.g. the directional antenna or mobile unit. Thus, for the directional antenna, the received signal level declines for larger radio distances from the antenna towards the border of the cell edge, in particular for the angular movement towards the cell border. This radio distance reflects the power loss moving away from the signal source. Note that two points with same radio distance from the source do not necessarily have to have the same geographical distance to that signal source. Mountains, buildings and similar objects may partially block or reduce the signals as received by the receiving unit, leading to a larger propagation loss in some directions Furthermore, the received signal level associated with the directional antenna unit and preferably also with the neighboring directional antenna unit should preferably exceed a second threshold T2. The portion of the antenna beam that does not fulfill these two conditions is then defined as the main beam sector The values of the first T1 and second T2 thresholds are preferably determined by the handover parameter settings used in the system. A single or multiple handover parameters may be used in determining the values of T1 and T2. Furthermore, the same handover parameter(s) or different parameters can be used in generating the two thresholds T1 and T2.

Figure 7:
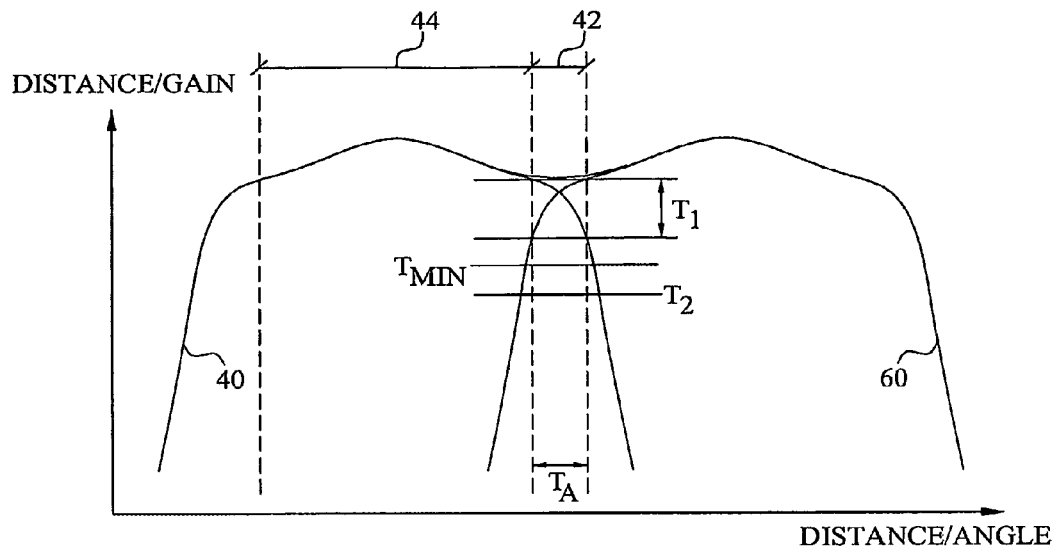
FIG. 7 is a schematic diagram illustrating another example of two neighboring antenna.

FIG. 7 is an antenna diagram illustrating the antenna beam or radio coverage 40, 60 of two neighboring directional antenna units arranged in a RBS. The antenna beams 40, 60 of these antennas have been optimized by the embodiment discussed in connection to FIG. 6 above. Thus, the antenna beam 40 of the directional antenna unit is (virtually) divided into at least a handover beam sector 42 and a main beam sector 44. In cases where the base station, in which the directional antenna is arranged, provides radio coverage in a general area, a corresponding antenna beam will be provided left of the beam 40 in the figure. In such a case, the antenna beam 40 will include a first handover beam sector 42, the main beam sector 44 and a second handover beam sector (not illustrated). However, it could be possible that the base station only provides radio coverage within a portion of the area so that the antenna beam 40 and its directional antenna unit only has a single neighboring beam 60 and directional antenna unit, respectively, of the same base station, as is illustrated in the figure. In such a case, the main beam sector 44 could constitute the remaining portion of the beam sector 40 in addition to the handover beam sector 42.

As is illustrated in the figure, within the handover beam sector 42, the difference in received signal level associated with the two neighboring directional antenna units is smaller than the first threshold T1. Furthermore, the received signal level associated with the directional antenna unit and preferably also of the neighboring directional antenna unit is above the second threshold T2 in this handover beam sector 42.

In order to maximize the performance of the radio communications system, the antenna beam sector shape or pattern and the handover parameter settings and, thus, the thresholds T1 and T2 should be optimized so that the antenna gain in the handover beam sector 42 exceeds the minimum threshold T.sub.min and preferably the angular interval of the handover beam sector 42 is larger than the angular threshold TA. The value of the threshold T1 is as small as possible, while the received signal levels in the beam sector 42 are as high as possible over the threshold T2. Furthermore, the antenna gain in the main beam sector 44 is preferably maximized.

As is evident from the antenna diagram of FIG. 7, in this example embodiment, the resulting optimization of different sub-sectors 42, 44 of the antenna beam 40 of the directional antenna will generate an overall beam shape that differs from the general smooth "cosine-shape" or "tear-shape" of prior art antennas. Instead, the radio coverage in the handover beam sector 42 is typically larger than for prior art solutions, which will result in the "knee-shaped" appearance of the antenna beam 40 in this beam sector 42. This increase in radio coverage in the handover area or beam sector 42 will result in a similar radio performance and coverage of the prior art MRC-based (or equivalent combining) softer handover procedures.

It is anticipated, that in some situations the gain of the directional antenna within the handover beam sector 42 may actually be decreased, e.g. due to a change of the handover parameters or the thresholds (TV). However, generally the directional antenna provides, more or less, always a higher gain level in the handover region or beam sector 42 compared to prior art systems with MRC and equivalent techniques.

Figure 8:
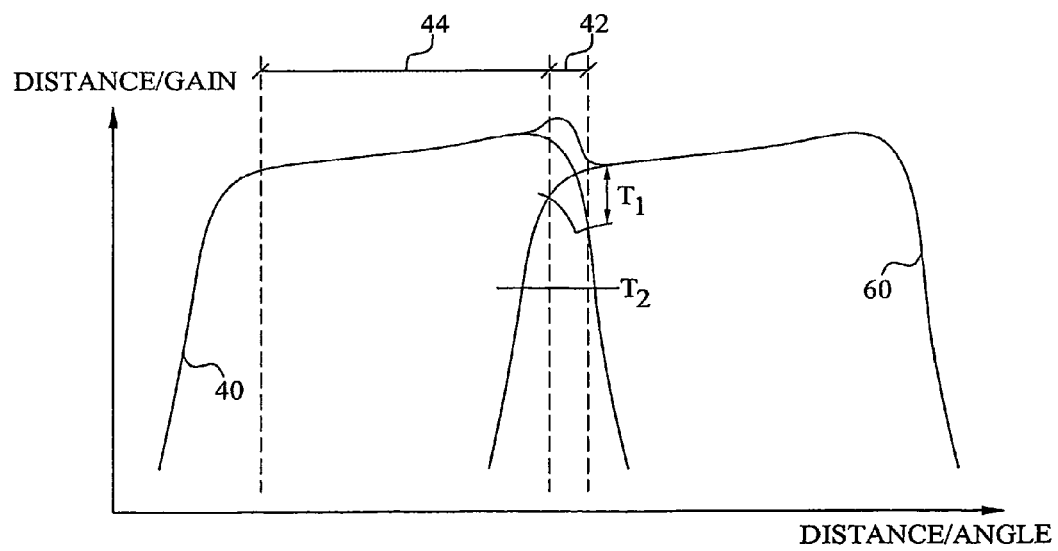
FIG. 8 is a schematic diagram illustrating a further example of two neighboring antenna beams optimized.

FIG. 8 is an illustration of another antenna diagram of two directional antenna beams 40, 60 optimized. In this embodiment, the antenna beam 40, 60 has an asymmetric shape with a maximum gain (radio coverage) in or close to the handover beam sector 42. As one follows the antenna beam 40 from the handover beam sector 42 and maximum gain, into the main beam sector 44 the received signal energy (maximum radio distance) will gradually decline. However, entering the handover beam sector 42 or the other end of the beam sector (which may be a second handover beam sector or constitute a portion of the main beam sector), the maximum allowable radio distance will fall rapidly per traveled distance in order to reduce interference with adjacent cells and not spreading the signal energy of the directional antenna far into neighboring cells.

Similar to FIG. 7, the received signal level in the handover beam sector 42 exceeds a second threshold T2 and the difference in received signal level of the two neighboring directional antenna units in this handover beam sector 42 is smaller than a first threshold T1. The values of the respective thresholds T1 and T2 are determined based on the settings of the handover parameters of the system, as was discussed above.

This principle of dividing the antenna beam in different beam sectors and then performing a differential optimization of the beam sector shapes in order to provide an increased antenna gain in the handover area can also be extended to a division of the antenna beam into more than two beam sectors.

FIG. 9 is a flow diagram of an embodiment of the jointly processing step of FIG. 3. The method continues from step S3 of FIG. 3. In the next step S31, signal or link qualities of the communications links to the mobile station are determined and compared for the at least two directional antenna units. These link qualities can be calculated or estimated based on measurement data obtained from the mobile unit and/or from the antenna units. Typical, non-limiting, examples of link qualities that can be used includes SNR (Signal to Noise Ratio), SIR (Signal to Interference Ratio), BLER (Block Error Ratio), BER (Bit Error Ratio) and BEP (Bit Error Probability). Based on the comparison of the link qualities, a communications link is selected in step S32. This communication link is the link (of the compared links) having the current highest or best link quality as determined based on the comparison. The processed user data is generated based on the detected user data associated with the selected link in step S33. The method then ends Thus, by selecting the currently most suitable communications link, the detected user data with a most correct data content is selected for further processing in the system. In cases where the detected data includes a control and payload data portion, the signal quality estimation can be determined based on measurements on the control portion, the payload portion or both of the control and payload portion.

The steps S31 to S33 of FIG. 9 are preferably performed on a communications block or frame basis. This then enables the selection of the presently "best" detected user data at any time instance. Alternatively, the quality measure generation and comparison and the data selection could be performed periodically or intermittently. In such a case, the detected user data stream associated with the selected link will then be used for the generation of the processed user data until a new comparison is performed.

Furthermore, the steps S31 to S33 can be performed in the RBS, in which the directional antenna units are arranged. Alternatively, the steps can be performed in external unit, e.g. a RNC connected to the RBS. This means that the intra-site handover will be handled as a conventional soft handover by the RNC, including the separate cell dataflow over the RNC-RBS interface. This results in a change of RNC configuration so that sectors or cells within sites are configured as independent cells, i.e. all handover areas are configured as soft handover areas and no softer handover areas will be present in the system.

FIG. 10 is a flow diagram illustrating another embodiment of the jointly processing step of FIG. 3. The method continues from step S3 of FIG. 3. In a next step S41, the information content of the first and second detected user data from the two neighboring directional antenna units are then combined. The result of such a data combining is the processed user data. By using information from both the detected user data as basis for the processed user data generation, a higher radio performance and coverage can typically be provided by the directional antennas compared to using a single user data source. This will then result in that the system will be able to correctly interpret and process user data originating from a mobile unit also in certain far-out regions, where the received user data typically would be so poor that a successful processing would be next to impossible if only one of the two detected user data flows would be used in the processed user data generation. As a consequence, larger radio coverage in the handover area is often obtained with this embodiment compared to the selection embodiment.

As was discussed above, the step S41 can be performed in the RBS or in an external unit, e.g. RNC. Furthermore, the data combining of step S41 can be performed solely on the payload data portion or the control data portion. Alternatively, the whole detected user data (control and payload) can be used in the combination process.

FIG. 11 is a flow diagram illustrating an embodiment of the user data signal detecting step of FIG. 3. In this embodiment a directional antenna unit includes at least two receivers (multiple antennas or a group antenna) in order to provide uplink diversity reception. The method continues from step S1 of FIG. 3. In step S51, a first transceiver (receiver) of a directional antenna unit receives the user data signal(s) originating from the mobile unit. Correspondingly, in step S52 a second transceiver of the same directional antenna unit receives the user data signals. These user data carrying signals then include similar information content as the signals received by the first transceiver. In a next step S53, the first detected (and demodulated) user data is generated based on the received user data signals of the first and second transceiver. This step includes signal detection and selection or combining, e.g. MRC, as is known in the art. The method then continues to step S3 of FIG. 3. Note that the steps S51 to S53 can also be performed for the second neighboring directional antenna unit in the RBS.

Figure 12:
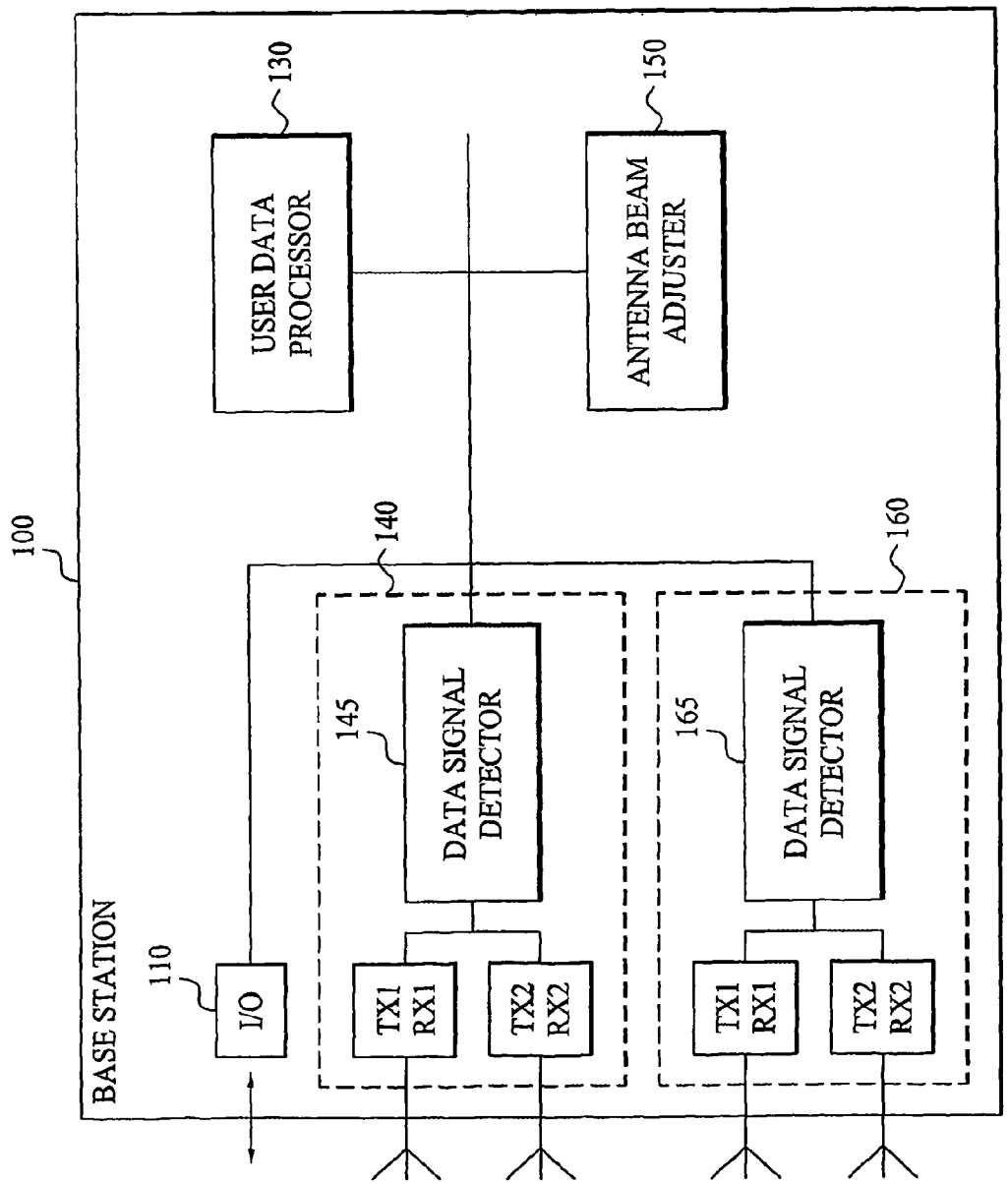

FIG. 12 is a schematic block diagram of an embodiment of a (radio) base station 100. The base station 100 includes directional antenna units 140, 160 that provides radio coverage within different cells or sectors of the total radio coverage area of the base station 100. In the figure, the base station 100 has been illustrated with only two directional antenna units 140, 160. However, this should merely been seen as an illustrative non-limiting example and the base station 100 could alternatively include more directional antenna units 140, 160, e.g. 3, 4, 6, 9 or 12. The directional antenna units 140 include at least one transceiver TX1/RX1, TX2/RX2, or at least one transmitter and one receiver each. These transceivers TX1/RX1, TX2/RX2 performs the communication with mobile units positioned in the cell of and connected to the respective directional antenna unit 140, 160. In order to provide uplink diversity reception, the directional antenna unit 140, 160 preferably includes at least two transceivers TX1/RX1, TX2/RX2. The transceivers TX1/RX1, TX2/RX2 are in particular arranged for receiving user data carrying signals originating from the mobile unit.

The directional antenna unit 140, 160 preferably also includes a data signal detector 145, 165 for performing the initial data signal processing and detection of the received user data signals. This detector 145, 165 can include functionality for signal processing, e.g. demodulation, A/D conversion, user data regeneration and/or decoding. The input to this data detector 145, 165 is the user data signals as received from the associated transceiver(s) TX1/RX1, TX2/RX2. This data signal detection and processing will generally imply a loss in performance of data, e.g. as manifested in reduced radio coverage of the associated antenna unit 140, 160. The detected user data from the data detectors 145, 165 of the directional antenna units involved in the intra-site handover procedure is then forwarded to a user data processor 130, either implemented in the base station 100 or provided elsewhere, e.g. in a RNC or BSC.

The user data processor 130 then jointly processes the detected user data from the at least two data detectors 145, 165. This jointly data processing could be implemented as a data content combining and/or data content selection, with or without additional side (soft) information e.g. quality indicators or quality estimators. In either case, processed user data is generated by the processor 130. This data can then be forwarded to other units in the communications system using for example an input and output (I/O) unit 110. For example, the processed user data can be transmitted to the RNC for further processing and/or transmission to another mobile unit The base station 100 preferably also includes an antenna beam adjuster 150 that is configured for generating antenna beam adjusting commands. Such commands will then cause a change in the antenna beam of the directional antenna units 140, 160 by adapting (increasing) the antenna gain in the handover area. The adjustment command can provide the beam sector shape by controlling an antenna adjusting unit (not illustrated) that is arranged and connected to the directional antenna units 140, 160. Such adjusting unit could then mechanically adjust, e.g. move and/or rotate, a mechanical structure in the antenna units 140, 160 in response to the adjustment command in order to obtain the desired beam shape. Such a mechanical structure can be the baffles around the antenna radiators, the ground plane behind the antenna radiators and/or a structure that couples the energy from the radiators, e.g. secondary radiators. If the directional antenna unit 140, 160 is a group antenna with multiple antennas, the command can, alternatively or in addition, cause the desired beam shape by adjusting the relative amplitude and/or phase excitations of the antennas. As the person skilled in the art understands, any procedure that results in an adjustment of the beam shape of an antenna could be used in order to cause the directional antenna unit 140, 160 to modify the antenna gain in the handover area. This adjuster 150 can alternatively be implemented in another network node, e.g. in the RNC. As was discussed above, both an increase and a decrease of the antenna gain in the handover area can be performed, depending on e.g. handover parameter or threshold values or any other feedback from the system.

The units 110 to 165 of the base station 100 may be implemented as software, hardware or a combination thereof. The units 110 to 165 may all be implemented in the base station 100 in a single network node in the communications system. Alternatively, the user data processor 130 and/or antenna beam adjuster 150 can be implemented in other network nodes in the communications system. For example, the user data processor 130 and/or antenna beam adjuster 150 may be arranged in a RNC, BSC or MSC (Mobile Switching Center) connected to and controlling operation of multiple base stations 100. In such a case, the data processor 130 and/or adjuster 150 can process detected user data from and control the antenna beam shape of multiple base stations 100, respectively.

Figure 13:
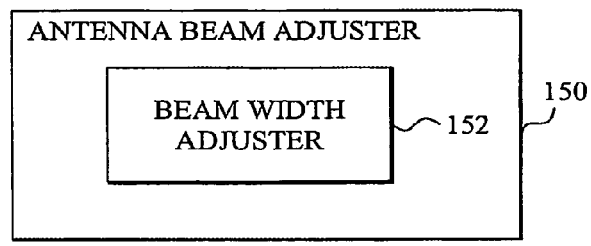
FIG. 13 is a schematic block diagram illustrating an embodiment of the antenna beam adjuster of FIG. 12.

FIG. 13 is a schematic block diagram of an embodiment of the antenna beam adjuster 150 of FIG. 12. This adjuster comprises a beam width adjuster 152 that generates an adjusting command that causes the gain increase in the handover area of a directional antenna unit by adjusting the (3 dB) beam width of the antenna. This beam width adjusting can be obtained by redistributing the directivity of the directional antenna unit in the horizontal dimension, possibly at the cost of the maximum peak gain for the antenna unit.

The unit 152 of the antenna beam adjuster 150 may be implemented as software, hardware or a combination thereof. The unit 152 may be implemented in a base station or in a more central network node, e.g. RNC.

Figure 14:
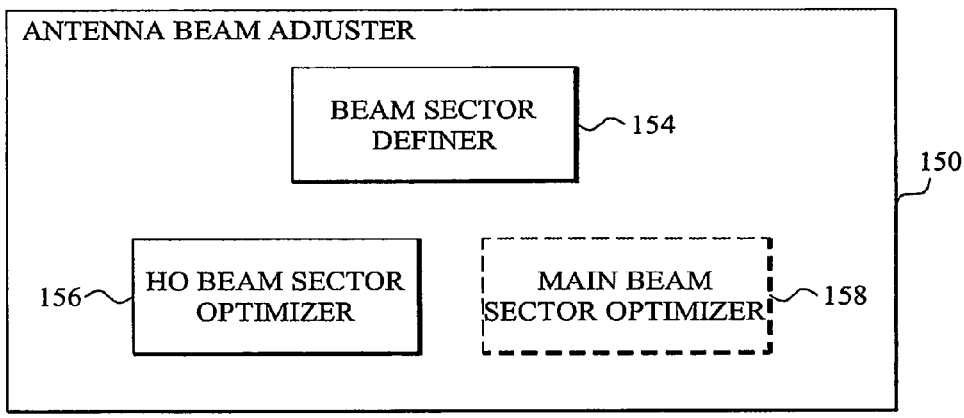
FIG. 14 is a schematic block diagram illustrating another embodiment of the antenna beam adjuster of FIG. 12.

FIG. 14 is a schematic block diagram of another embodiment of an antenna beam adjuster 150. The antenna beam adjuster 150 includes a beam sector definer 154 that is configured for defining multiple beam sectors of the antenna beam of a directional antenna unit. In a first embodiment, the definer 154 is adapted for (virtually) dividing the antenna beam into at least a handover beam sector and a main beam sector. This beam sector definer 154 is preferably configured for defining the handover beam sector as the portion of the antenna beam in which the difference in signal levels (as measured by the directional antenna or as measured by the mobile unit and then transmitted to the directional antenna) associated with the directional antenna unit and a neighboring directional antenna unit exceeds a first threshold value. Alternatively, or in addition, the signal level is preferably above a second threshold within this beam sector. The values of the first and second threshold are determined based on handover parameter data or other input data from other units in the system. Such input data could state than one and the same beam sector definition should be used for all directional antenna units in the system, or alternatively different definitions could be employed for different antenna units, e.g. if they are arranged in areas with different expected traffic conditions. Furthermore, the beam sector definition of a given antenna unit could be fixed or change over time, e.g. based on new input data. The definer 154 preferably bases the beam sector definitions on signal level threshold values, which in turn may be determined based on handover parameter settings or values. This threshold data may be retrieved from the data storage (not illustrated) arranged in the adjuster 150. Alternatively, the definer 154 preferably receives the information used in the beams sector definition process from an external unit in the system. In another embodiment, at least three different beam sectors are defined.

A handover beam sector optimizer 156 is arranged in the beam adjuster 150 for receiving information of the current beam sector definition from the definer 154 and for optimizing and adjusting the shape of the handover beam sector in order to increase (or sometimes decrease, depending on current parameter values) the antenna gain in this beam sector. This beam sector optimizer 154 is preferably configured for generating an adjustment command that causes a directional antenna unit to provide an antenna gain in the handover beam sector that exceeds a minimum threshold. Furthermore, the adjustment command preferably also, or in addition, provides an angular interval or size of the handover beam sector above an angular threshold. The values of these thresholds are determined based on handover parameter data e.g. as retrieved from the data storage.

The antenna beam optimizer 150 can optionally include an optimizer 158 for adjusting the beam shape of the main beam sector. This optimizer 158 preferably generates an adjustment command that causes the directional antenna unit to maximize the antenna gain in this main beam sector.

The units 154 to 158 of the antenna beam optimizer 150 may be implemented as software, hardware or a combination thereof. The units 154 to 158 may all be implemented in the antenna beam optimizer 150. Alternatively, a distributed implementation is also possible with some or all units 154 to 158 implemented in the base station and/or RNC.

Figure 15:
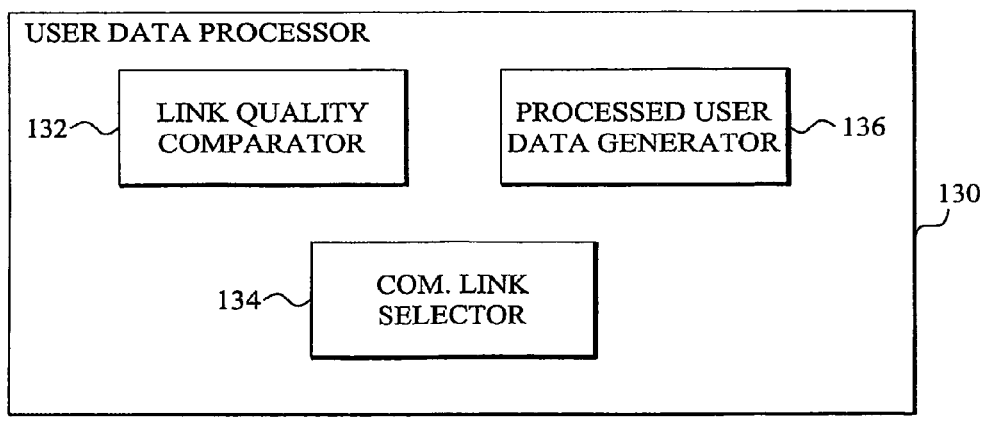
FIG. 15 is a schematic block diagram illustrating an embodiment of the data processor of FIG. 12

FIG. 15 is a schematic block diagram of an embodiment of a user data processor 130. This processor 130 receives signal or link quality data from units that perform such quality measurements and estimations. Such measuring units can be implemented in the directional antenna units and/or in the mobile units. In either case, the qualities are forwarded to a link quality comparator 132 that compares the qualities of the communications links between the mobile unit and different directional antenna units provided in the same base station. This quality generation and comparison can be performed on control data, payload data and/or control and payload data. The quality measures are preferably determined on a per frame or block basis so that the comparator 132 can operate per each frame or radio block. Alternatively, the quality comparison could be performed periodically or intermittently.

A communications link selector 134 then selects the communications link and associated directional antenna unit with a best link quality. If the comparison is performed on frame/block basis the selection will provide the current best communications link. A processed user data generator 136 then generated processed user data based on the detected user data associated with the selected communication link or directional antenna unit. Thus, by selecting the currently most appropriate link the corresponding detected user data typically includes the most correct data content.

The units 132 to 136 of the user data processor 130 may be implemented as software, hardware or a combination thereof.

The units 132 to 136 may all be implemented in the user data processor 130. Alternatively, a distributed implementation is also possible with some or all units 132 to 136 implemented in the base station and/or RNC.

Figure 16:
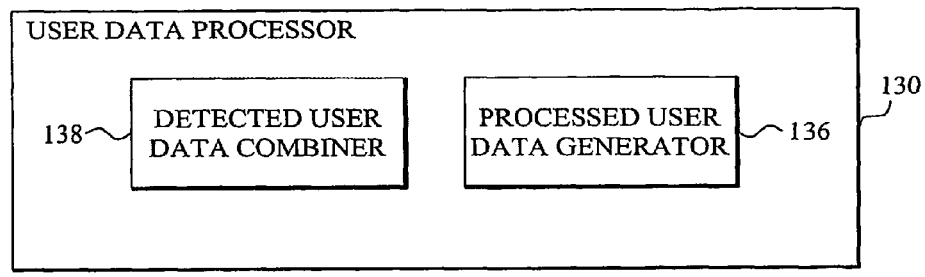
FIG. 16 is a schematic block diagram illustrating another embodiment of the data processor of FIG. 12.

FIG. 16 is a schematic block diagram of another embodiment of a user data processor 130. This processor 130 includes a data combiner 138 that is configured for combining the information content of the at least two detected user data. Thus, by combining the two user data sets the quality of the resulting processed user data can be enhanced compared to if only one of the detected user data sets is used as the sole data source. The combiner 138 could be configured for only combining the payload or control data portion of the detected user data. Alternatively, the whole content of the detected user data is used in the combining process. The generator 136 then generates the processed user data based on these (combined and demodulated) detected user data.

Although not illustrated in the figure, the user data processor 130 of FIG. 16 can include a similar link quality comparator or processor as was discussed above in connection with FIG. 15. Thus, also side or soft information, such as quality indicators or quality estimators, can be used in the data combining process. For example, instead by simply combining the detected user data streams in the combiner 138, quality indicators of the communications link associated with the respective data stream can be used for enabling a weighted data stream combining. Thus, the combiner 138 uses information from a link quality comparator arranged in the user data processor 130 for generating weights to use in the data combining. These weights are then applied to the data streams so that, typically, a detected data stream originating from a link with a good link quality will be weighted higher than a data stream from a poor communications link Thus, in this embodiment there may be a choice in also using the additional soft information (quality indicators or estimations) in the jointly processing of the detected user data.

The units 136 and 138 of the user data processor 130 may be implemented as software, hardware or a combination thereof. The units 136 and 138 may all be implemented in the user data processor 130. Alternatively, a distributed implementation is also possible with some or all units 136 and 138 implemented in the base station and/or RNC. In addition, a link quality processor or comparator can be implemented in the user data processor 130 for introducing soft information in the data processing.

Figure 17:
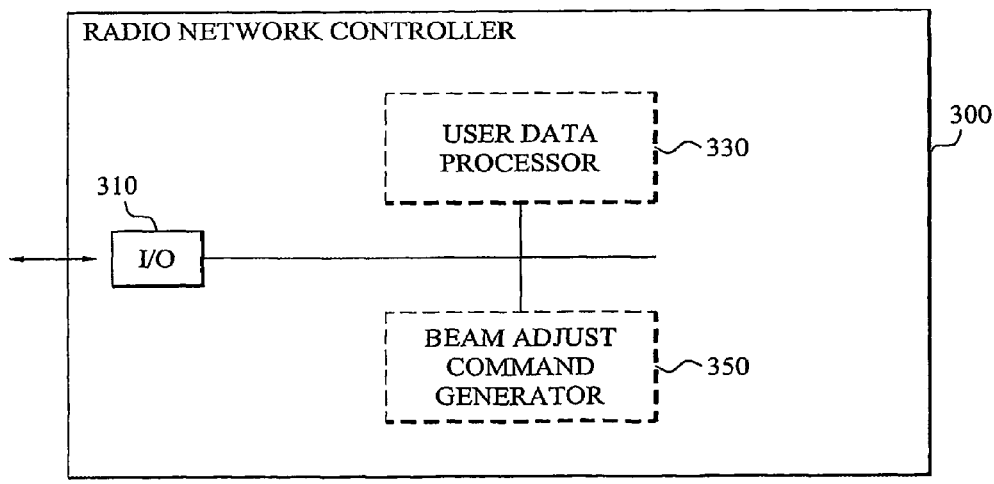
FIG. 17 is a schematic block diagram illustrating a radio network controller.

FIG. 17 is a schematic block diagram of a radio network controller 300. The RNC 300 generally includes an I/O unit 310 for conducting communication with external units. The I/O unit 310 is in particular configured for received processed user data and/or detected user data from connected base stations. In an embodiment of the invention, the I/O unit 310 also transmits antenna beam adjusting commands to base stations.

An optional user data processor 330 is implemented in the RNC 300 for generating processed user data based on detected user data received from a base station. This processor 330 could be configured for operating according to the data selection and/or combing process discussed above in connection with FIGS. 15 and 16, respectively. The resulting processed user data can then be forwarded through the I/O unit 310 to other units in the communications system.

An optional beam adjust command generator 350 can be arranged in the RNC 300 for generating beam adjusting commands that causes the directional antenna units to increase their antenna gain in the handover areas. This command generator 350 can be operated according to the embodiments discussed above in connection with FIG. 13 and/or FIG. 14.

The command generator 350 can then preferably control operation of multiple directional antenna units provided in different base stations.

The units 310 to 350 of the RNC 300 may be implemented as software, hardware or a combination thereof. The units 310 to 350 may all be implemented in the RNC 300. Alternatively, a distributed implementation is also possible with some or all units 310 to 350 implemented in the base station and/or other network nodes.

It will be understood by a person skilled in the art that various modifications and changes may be made without departure from the scope of the appended claims.

The invention claimed is:

1. A method of processing data in a communications system comprising a base station having multiple directional transceiver units and a mobile unit connected to a first and a second directional transceiver unit of said base station and positioned in a handover area associated with said first and second directional transceiver unit, said method comprising the steps of:
   said first directional transceiver unit detecting a data carrying signal originating from said mobile unit and generating first detected data based on said data carrying signal;
   said second directional transceiver unit detecting said data carrying signal originating from said mobile unit and generating second detected data based on said data carrying signal;
   processing said first detected data and said second detected data to provide processed data; and
   modifying an antenna gain of said first directional transceiver unit in said handover area for improving the radio performance of said first directional transceiver unit in said handover area.

2. The method according to claim 1, wherein said antenna gain modifying step comprises increasing said antenna gain in said handover area in order to compensate for a radio performance reduction in said handover area caused by said data carrying signal detection.

3. The method according to claim 1, further comprising comparing a link quality of a communications link between said mobile unit and said first directional transceiver unit and of a communications link between said mobile unit and said second directional transceiver unit, and wherein said processing step comprises the steps of:
   selecting a communications link having a highest link quality of said compared communications links; and
   generating said processed data based on the detected data generated by a directional transceiver unit associated with said selected communications link.

4. The method according to claim 1, wherein said processing step comprises generating said processed data by combining said first detected data and said second detected data.

5. The method according to claim 1, wherein said antenna gain modifying step comprises increasing a beam width of a beam sector of said first directional transceiver unit.

6. The method according to claim 1, wherein said antenna gain modifying step comprises the steps of:
   defining a handover beam sector of an antenna beam of said first directional transceiver unit; and
   adapting a shape of said handover beam sector based on a handover parameter setting associated with said base station.

7. Apparatus for use in a communications system comprising a base station having multiple directional transceiver units and a mobile unit connected to a first and a second directional transceiver unit of said base station and positioned in a handover area associated with said first and second directional transceiver unit, said first and second directional transceiver unit comprising transceiving circuitry for receiving a data carrying signal originating from said mobile unit and detection circuitry configured to generate first and second detected data based on said data carrying signal, said system comprising:
- a processor for processing said first detected data and said second detected data to provide processed data; and
- beam adjustment circuitry configured to modify an antenna gain of said first directional transceiver unit in said handover area for incrementing the radio performance of said first directional transceiver unit in said handover area.

8. The apparatus according to claim 7, wherein said beam adjustment circuitry is configured to modify said antenna gain in order to compensate for performance reduction caused by operation of said detection circuitry.

9. The apparatus according to claim 7, further comprising a comparator configured to compare a link quality of a communications link between said mobile unit and said first directional transceiver unit and of a communications link between said mobile unit and said second directional transceiver unit, and wherein said processor is configured to:
- select a communications link having a higher link quality of said compared communications links; and
- generate said processed data based on the detected data from the detection circuitry of a directional transceiver unit associated with said selected communications link.

10. The apparatus according to claim 7, wherein said beam adjustment circuitry is configured to adjust a beam width of a beam sector of said first directional transceiver unit.

11. The apparatus according to claim 7, wherein said beam adjustment circuitry is configured to:
- define a handover beam sector of an antenna beam of said first directional transceiver unit; and
- adapt a shape of said handover beam sector based on a handover parameter setting associated with said base station.

12. The apparatus according to claim 7, wherein said processor is provided in a radio network controlling unit connected to and controlling operation of said base station.

13. A base station having multiple transceiver units in a communications system, said base station comprising:
- a first directional transceiver unit for communicating with a mobile unit and including:
  - transceiving circuitry configured to receive a data carrying signal originating from said mobile unit; and
  - detection circuitry configured to generate first detected data from said received data carrying signal;
- a second transceiver unit connected to said mobile unit and comprising:
  - transceiving circuitry configured to receive said data carrying signal originating from said mobile unit; and
  - detection circuitry configured to generate second detected data from said received data carrying signal;
- a processor configured to process said first detected data and said second detected data to provide processed data; and
- beam adjustment circuitry to adjust an antenna gain of said first directional transceiver unit in said handover area for improving radio performance of said first directional transceiver unit in said handover area.

14. The base station according to claim 13, wherein said beam adjustment circuitry is configured to increase said antenna gain in order to compensate for performance reduction caused by operation of said detection circuitry.

15. The base station according to claim 13, further comprising a comparator for comparing a link quality of a communications link between said mobile unit and said first directional transceiver unit and of a communications link between said mobile unit and said second directional transceiver unit, and wherein said processor is configured to:
- select a communications link having a higher link quality of said compared communications links; and
- generate said processed data based on the detected data from the detection circuitry of a directional transceiver unit associated with said selected communications link.

16. The base station according to claim 13, wherein said processor is configured to:
combine said first detected data and said second detected data; and
generate said processed data based on said combined data.

17. The base station according to claim 13, wherein said beam adjustment circuitry is configured to adjust a beam width of a beam sector of said first directional transceiver unit.

18. The base station according to claim 13, wherein said beam adjustment circuitry is configured to:
- define a handover beam sector of an antenna beam of said first directional transceiver unit; and
- optimize a shape of said handover beam sector based on a handover parameter setting associated with said base station.

* * * * *

UNITED STATES PATENT AND TRADEMARK OFFICE
CERTIFICATE OF CORRECTION

PATENT NO. : 8,706,121 B2
APPLICATION NO. : 13/764442
DATED : April 22, 2014
INVENTOR(S) : Hagerman et al.

It is certified that error appears in the above-identified patent and that said Letters Patent is hereby corrected as shown below:

In the drawings

Fig. 6, Sheet 4 of 9, for Tag "S22", in Line 3, delete "PARAMTER" and insert -- PARAMETER --, therefor.

In the specification

Column 1, Line 17, delete "systems" and insert -- systems. --, therefor.

Column 1, Line 22, delete "(radio)" and insert -- radio --, therefor.

Column 2, Line 18, delete "drawbacks" and insert -- drawbacks. --, therefor.

Column 3, Line 16, delete "system" and insert -- system. --, therefor.

Column 4, Line 22, delete "FIG. 12 is a schematic block diagram illustrating a;" and insert -- FIG. 12 is a schematic block diagram illustrating a base station according to the present invention; --, therefor.

Column 4, Line 28, delete "FIG. 12" and insert -- FIG. 12; --, therefor.

Column 5, Line 45, delete "in a" and insert -- in an --, therefor.

Column 5, Line 48, delete "to detected" and insert -- to detect --, therefor.

Column 8, Line 2, delete "obtained" and insert -- obtained. --, therefor.

Column 8, Line 31, delete "step S1," and insert -- step S11, --, therefor.

Column 9, Lines 24-25, delete "directions" and insert -- directions. --, therefor.

Signed and Sealed this
Twentieth Day of October, 2015

Michelle K. Lee
*Director of the United States Patent and Trademark Office*

CERTIFICATE OF CORRECTION (continued)
U.S. Pat. No. 8,706,121 B2

Column 9, Line 31, delete "sector" and insert -- sector. --, therefor.

Column 11, Line 7, delete "ends" and insert -- ends. --, therefor.

Column 12, Line 58, delete "unit" and insert -- unit. --, therefor.

Column 14, Line 30, delete "optimizer 150" and insert -- adjuster 150 --, therefor.

Column 14, Line 35, delete "optimizer 150" and insert -- adjuster 150 --, therefor.

Column 14, Line 38, delete "optimizer 150." and insert -- adjuster 150. --, therefor.

Column 15, Line 33, delete "link" and insert -- link. --, therefor.

In the claims

Column 16, Line 64, in Claim 7, delete "Apparatus" and insert -- An apparatus --, therefor.